United States Patent

Lutz et al.

Patent Number: 6,056,313
Date of Patent: May 2, 2000

[54] GAS BAG MODULE FOR A VEHICULAR OCCUPANT RESTRAINT SYSTEM

[75] Inventors: Joachim Lutz, Schechingen; Reiner Dannenhauer, Welzheim; Jens Debler, Herlikofen, all of Germany

[73] Assignee: TRW Occupant Restraint Systems GmbH & Co. KG, Alfdorf, Germany

[21] Appl. No.: 09/052,302

[22] Filed: Mar. 31, 1998

[30] Foreign Application Priority Data

Apr. 8, 1997 [DE] Germany .................. 297 06 246 U

[51] Int. Cl.⁷ .................................................. B60R 21/16
[52] U.S. Cl. ................. 280/728.1; 280/732; 280/728.2; 280/743.1; 280/731; 280/728.3
[58] Field of Search ................. 280/728.2, 732, 280/743.1, 731, 728.1, 728.3, 682, 547, 476

[56] References Cited

U.S. PATENT DOCUMENTS

| | | | |
|---|---|---|---|
| 5,312,129 | 5/1994 | Ogawa | 280/728 |
| 5,556,127 | 9/1996 | Hurford et al. | 280/730.2 |
| 5,639,112 | 6/1997 | Phillion et al. | 280/728.2 |
| 5,788,267 | 8/1998 | Lotspih et al. | 280/728.2 |
| 5,788,269 | 8/1998 | Jakavski et al. | 280/728.2 |
| 5,791,682 | 8/1998 | Hiramitsu et al. | 280/728.2 |
| 5,806,879 | 9/1998 | Hamada et al. | 280/728.2 |
| 5,839,751 | 11/1998 | Lutz . | |
| 5,867,058 | 3/1999 | Nemoto | 280/728.2 |
| 5,899,487 | 5/1999 | Fischer | 280/728.3 |
| 5,934,700 | 8/1999 | Disam et al. | 280/728.2 |

*Primary Examiner*—Lanna Mai
*Assistant Examiner*—Hau Phan
*Attorney, Agent, or Firm*—Tarolli, Sundheim, Covell, Tummino & Szabo L.L.P.

[57] ABSTRACT

A gas bag module comprises a housing for an inflator, a retaining ring for a gas bag and a cover for said gas bag. The housing, the retaining ring and the cover are formed from plastic material. The cover is provided with latching elements snapped into place on the retaining ring.

17 Claims, 8 Drawing Sheets

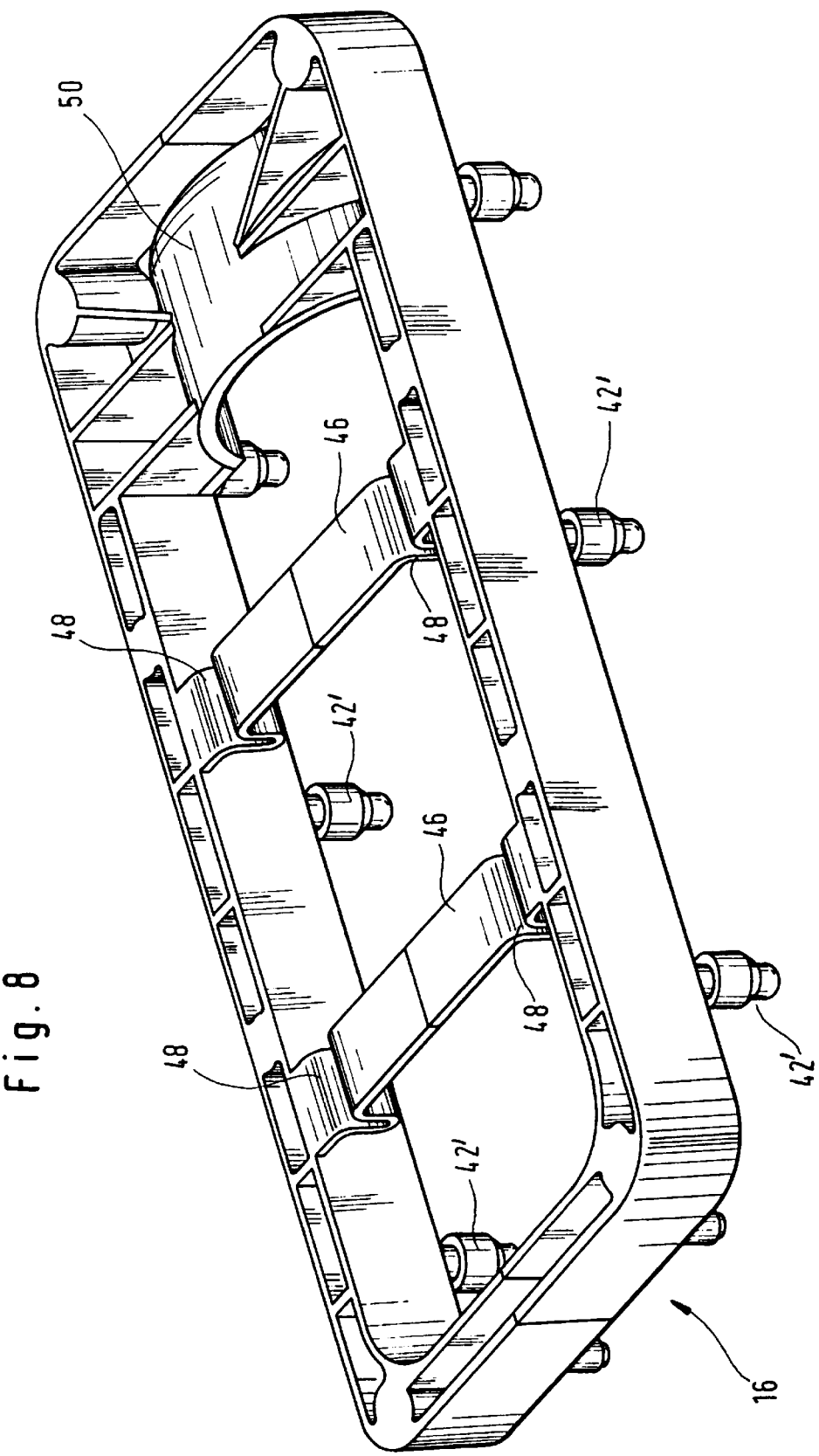

GAS BAG MODULE FOR A VEHICULAR OCCUPANT RESTRAINT SYSTEM

The invention relates to a gas bag module for a vehicular occupant restraint system.

BACKGROUND OF THE INVENTION

Such a gas bag module comprises a housing for an inflator and a retaining ring for a gas bag, which are both formed of a plastic material, and further a cover for the gas bag.

Such a gas bag module, which is known from U.S. Pat. No. 5,839,751, is meanwhile a usual vehicular component, this being the reason why its functioning is not detailed in the following. One emphasis on which further development of known gas bag modules concentrates is to simplify or facilitate their production without affecting the properties of the gas bag module.

Following activation of the inflator which translates the gas bag from its compact folded condition into its deployed condition, a high pressure occurs in the interior of the housing; apart from this the housing is exposed to a hot gas jet. It is for these reasons that it has until recently been assumed that only housings of metal are able to withstand the stresses occurring during activation. This applies also to the retaining ring with which the gas bag is secured to the housing. It has been assumed until recently that only a retaining ring of metal offers the required strength so that the gas bag is secured to the housing during deployment with the necessary reliability. The above mentioned document provides a gas bag module wherein the housing and the retaining ring are made of a plastic material, this being based on the discovery that plastic materials alone are already able to satisfy the requirements demanded of the housing and the retaining ring of a gas bag module. In addition to this, a housing of plastic material can be fabricated much more cost effectively than a housing of metal, thus cost benefits materialize during production. Furthermore, a housing of plastic material, which can be injection molded, for instance, can be fabricated in very much more complex designs than a conventional housing of metal so that a housing in accordance with the invention can be adapted very simply to the specific conditions of application. However, fabricating and mounting the gas bag cover at the housing still poses a problem since these usually involve complicated manufacturing and mounting steps.

BRIEF DESCRIPTION OF THE INVENTION

The invention provides a gas bag module in which the cover can be fabricated and mounted at the housing in a simple way. This is achieved with a gas bag module for a vehicular occupant restraint system, comprising a housing for an inflator, a retaining ring for a gas bag and a cover for said gas bag. The housing, the retaining ring and the cover are formed from plastic material. The cover is provided with latching elements snapped into place on the retaining ring. In this configuration, a particularly simple means of prelocating the cover on the retaining ring is achieved; in this way, when the retaining ring is prepared with a folded gas bag, a preassembled unit is formed. It has been found that also in the case of a gas bag cover it is possible to do away with the metal reinforcements usually required for conventional covers, without affecting the strength.

In accordance with the preferred embodiment of the invention, provision is further made that the cover is provided with positioning elements engaging complementary positioning parts on the housing with an interlocking fit. This interlocking fit between cover and housing considerably improves the seating of the cover on the housing, particularly in the case of deformations of the housing due to the pressure effective within the housing on activation of the inflator.

In accordance with the preferred embodiment of the invention, it is further provided for that the retaining ring comprises at least one snap-action hook locked into place at a complementary opening in the housing. In this configuration, the retaining ring together with the cover secured thereto, can be prelocated in a very simple manner on the housing, prior to the retaining ring and the cover being finally bolted to the inflator.

In accordance with the preferred embodiment of the invention, it is provided for that the gas bag module is elongated and the retaining ring is provided with expansion structures permitting a widening in a direction transverse to the longitudinal axis of the module in the plane of extension of the retaining ring. This configuration permits, similar to the interlocking fit used between the cover and the housing, that the retaining ring remains reliably secured to the housing when the latter is possibly caused to deform and that it follows any such deformations without affecting the function of the gas bag module.

In accordance with the preferred embodiment of the invention, it is still further provided for that the cover is box-shaped with a closed upper side facing away from the housing and an open underside facing the housing, the cover comprising sidewalls extending between the upper side and the underside, with notches being formed in the sidewalls and emanating from the underside. These notches facilitate, for one thing, mounting the cover on the retaining ring and, for another, permit - just like the expanding structure of the retaining ring and the interlocking fit between the cover and the housing - the cover following any deformations of the housing without affecting the function of the gas bag module.

Further details of the invention will be apparent from the sub-claims.

BRIEF DESCRIPTION OF THE DRAWINGS

The invention will now be described with reference to a preferred embodiment as illustrated in the drawings, in which:

FIG. 8 is a perspective view of the retaining ring of the gas bag module shown in FIGS. 4 to 7.

DETAILED DESCRIPTION OF THE INVENTION

Figure 1:
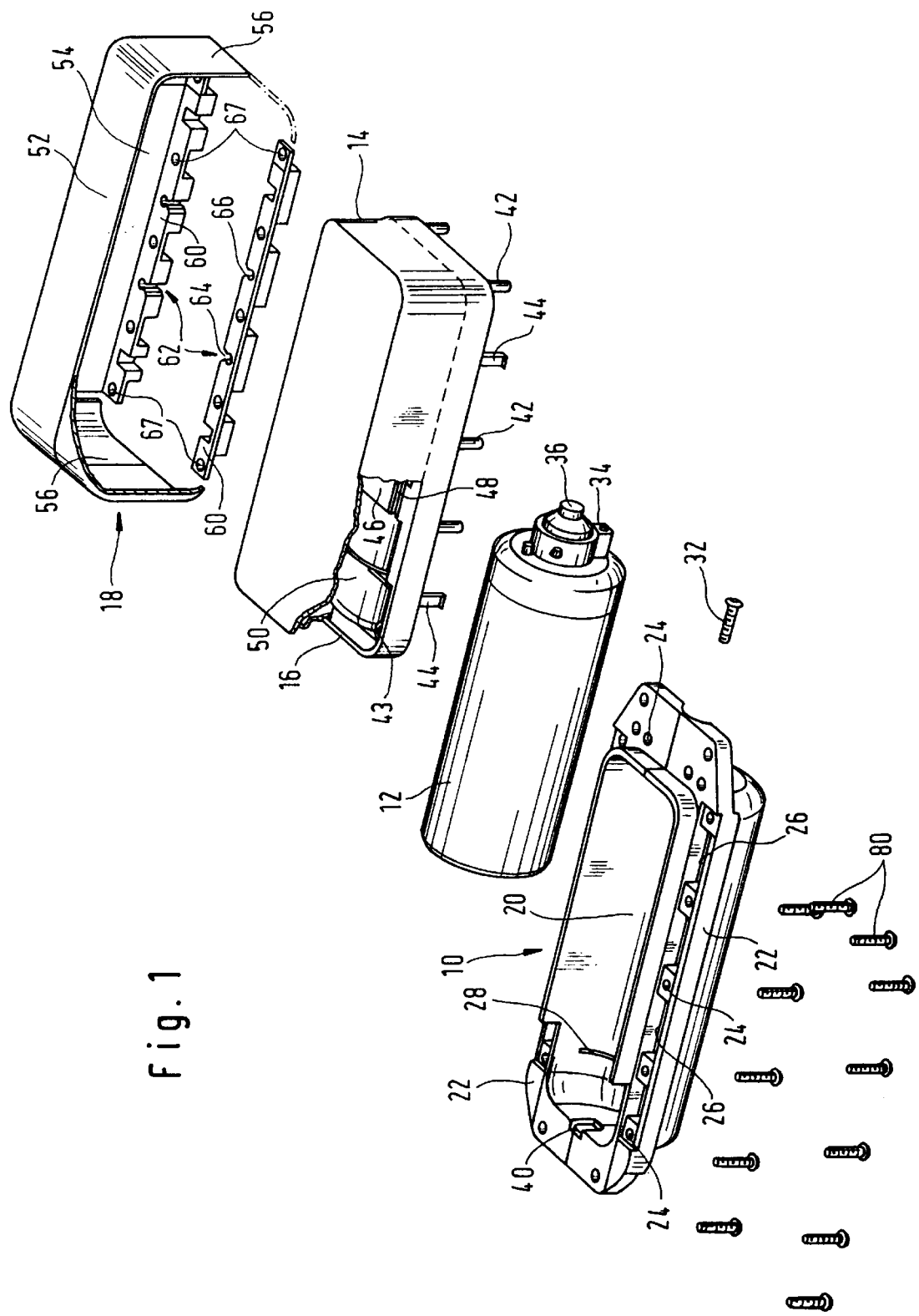
FIG. 1 is an exploded view of a gas bag module in accordance with the invention.
Figure 2:
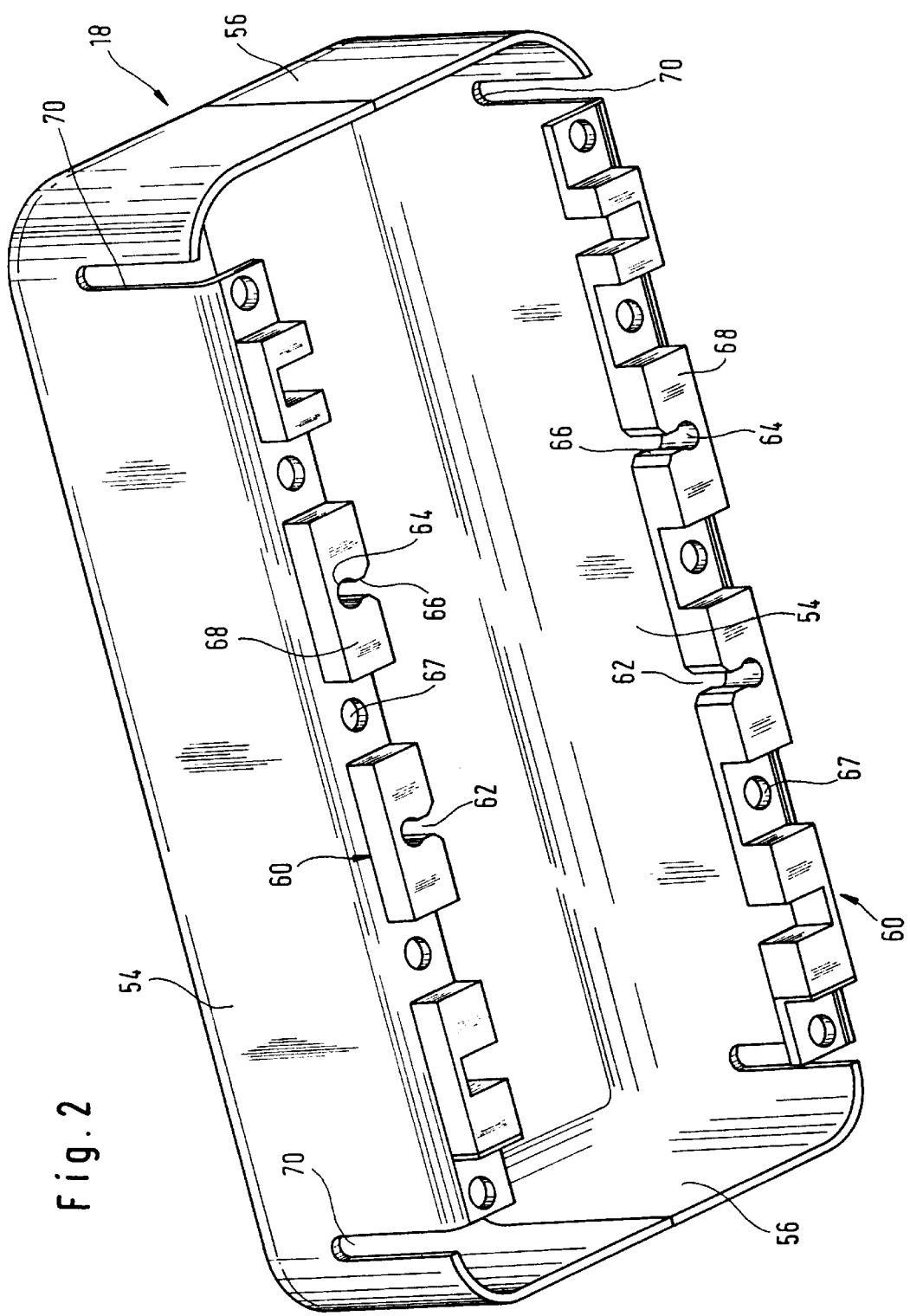
FIG. 2 is a perspective view from underneath of the cover as used with the gas bag module in accordance with the invention.
Figure 3:
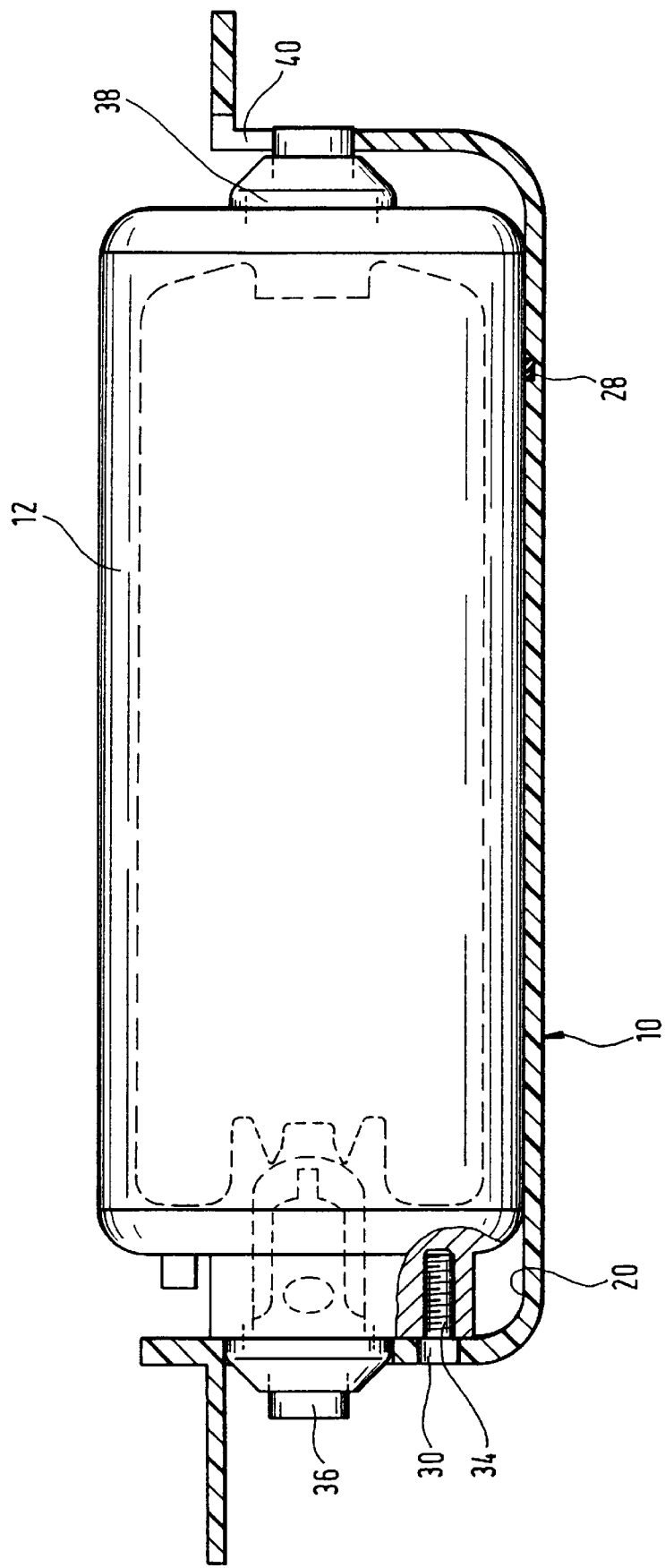
FIG. 3 is a view of a schematic longitudinal section through the gas bag module in accordance with the invention.
Figure 4:
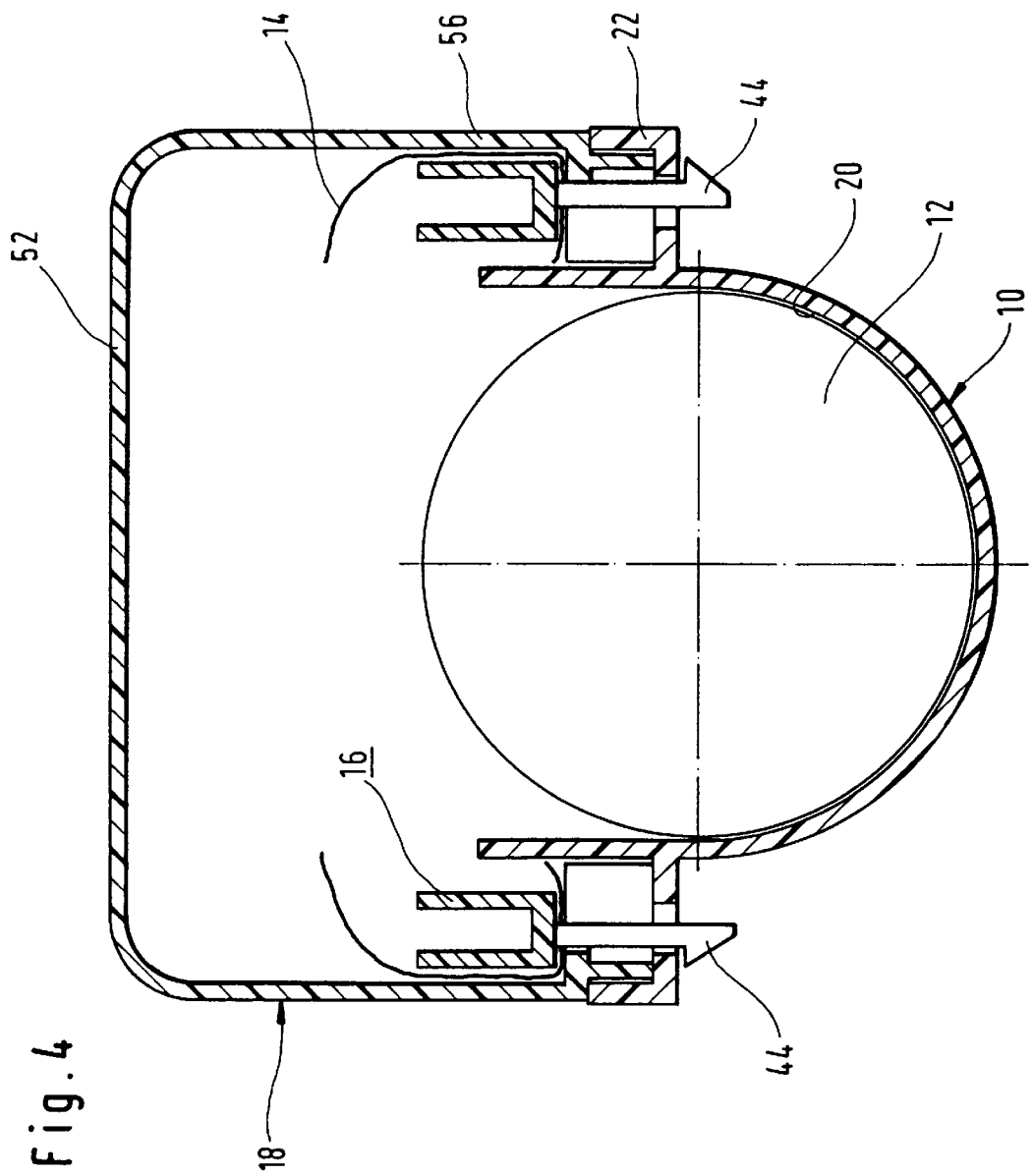
FIG. 4 is a view of a schematic cross-sectional view through one variant of the gas bag module in accordance with the invention, in a plane taken through the snap-action hooks.
Figure 5:
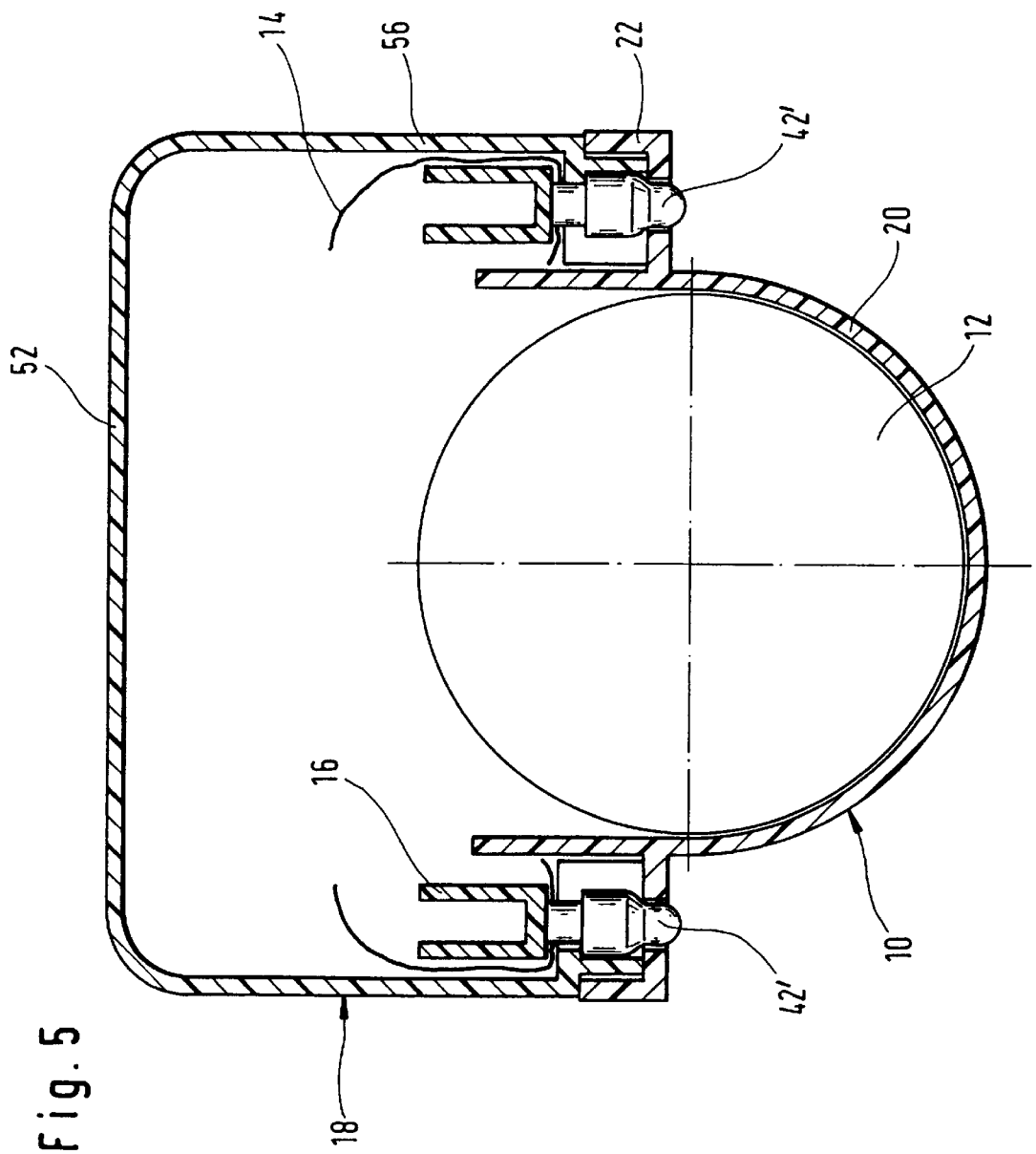
FIG. 5 is a view of a schematic cross-sectional view through one variant of the gas bag module in accordance with the invention, in a plane passing through the latching pins.
Figure 6:
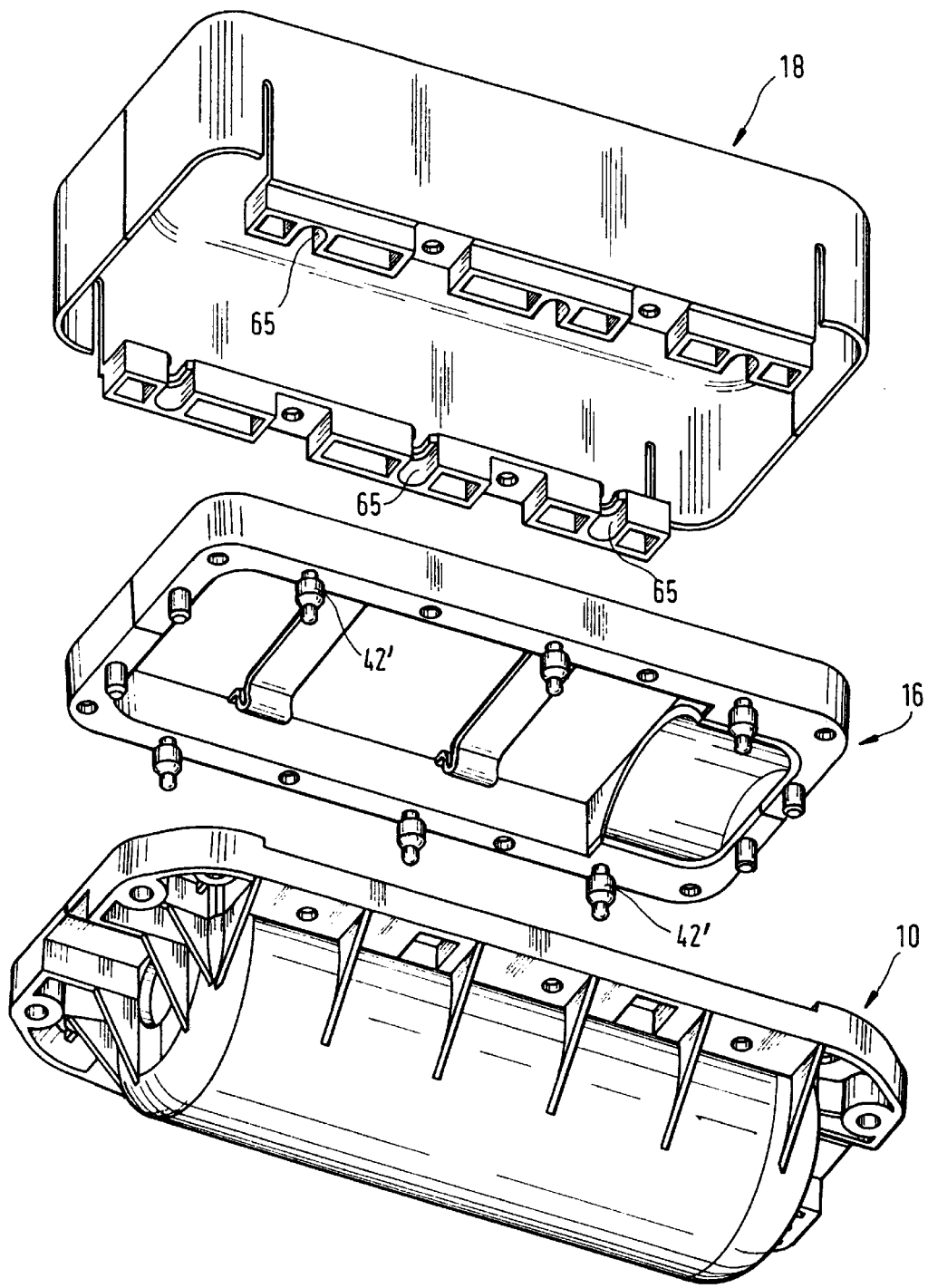
FIG. 6 is an exploded view of the variant of a gas bag module in accordance with the invention as viewed from underneath.
Figure 7:
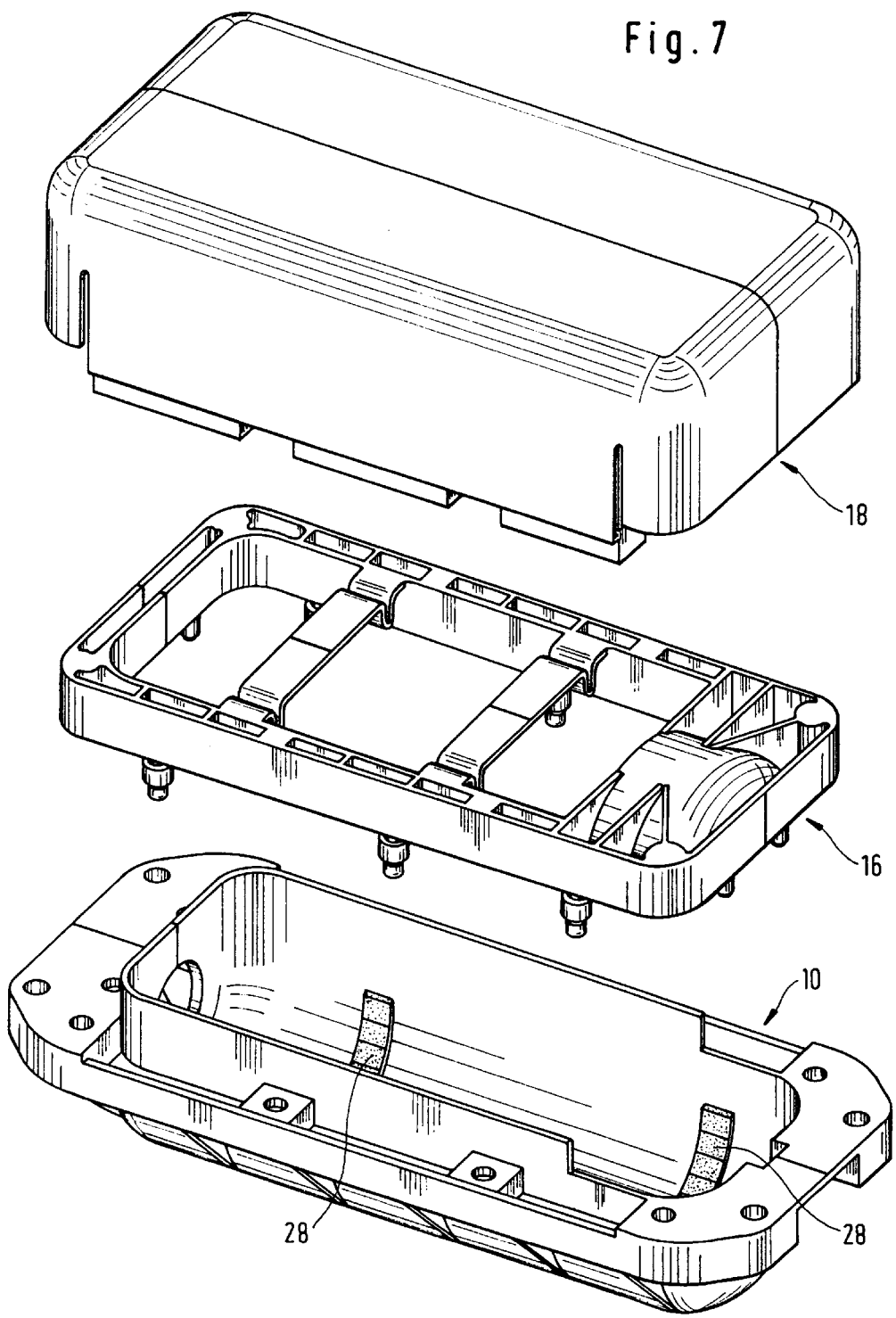
FIG. 7 is a schematic exploded view of the variant of the gas bag module shown in FIGS. 4 to 6 as viewed from above.

The gas bag module illustrated in FIGS. 1 to 3 substantially comprises a housing 10 in which an inflator 12 is arranged, a gas bag 14 provided with a retaining ring 16, and a cover 18.

The housing 10 is elongated in shape and provided with a tub-like mount 20 for the inflator 12. Along the longitudinal sides of the housing 10 a mounting ledge 22 extends, this mounting ledge being provided with openings 24 as well as with positioning recesses 26, the function of which is described further below. The mount 20 of the housing 10 is, in addition, provided with a sealing strip 28 which, when the inflator 12 is inserted in the mount 20, is in snug contact with the outer circumference of the latter so that in the region of the corresponding axial end of the inflator a sealed chamber is formed. The housing 10 features furthermore a hole 30 for a locating bolt 32 which can be screwed into a threaded hole 34 of the inflator 12.

The inflator 12 is generally cylindrical in shape and is inserted in the mount 20 of the housing 10 such that the threaded hole 34 is located opposite the hole 30. Subsequently, the locating bolt 32 can be screwed into the threaded hole 34 so that the inflator 12 is located in the housing 10 to form a preassembled module. The inflator 12 shown in the Figures is a multistage inflator which further to the igniter 36 itself is provided with an additional igniter 38 located in a groove 40 in the housing 10. The sealing strip 28 snugly engaging the inflator 12 when the latter has been inserted in the housing 10 has the task of ensuring that no power loss occurs due to gas, generated by the inflator 12, flowing through the mount 20.

In its interior the gas bag 14 is provided with the retaining ring 16. This retaining ring, inserted into the gas bag through the inflation orifice of the gas bag 14, is fastened in the region of the rim of the inflation opening by means of latching pins 42, pressed into the retaining ring and passing through corresponding openings in the rim of the inflation opening of the gas bag 14. The retaining ring 16 is provided with openings 43 located opposite the openings 24 when the retaining ring is fitted to the housing 10. The retaining ring 16 is, in addition, provided with snap-action hooks 44 capable of locking into place in complementary openings in the housing 10. The retaining ring 16 is further provided with a supporting land 46 extending between two opposing longitudinal sides of the retaining ring 16, the supporting land being connected at each of its ends to the longitudinal sides by a deformation section 48. Finally, the retaining ring 16 is provided with a shell-like retaining section 50 which engages the outer circumference of the inflator 12 and holds it in position when the retaining ring 16 is set onto the housing 10.

The cover 18 is configured box-shaped and comprises a closed upper side 52 as well as four sidewalls 54 and 56, respectively, extending therefrom. At each of the free lower edges of the two longitudinal sidewalls 54 of the cover 18, a latching strip 60 is provided, each latching strip 60 being provided with several recesses 62 having a widened portion 64, the diameter of which corresponds to the diameter of the latching pins 42, and having a clamping section 66, the width of which is smaller than the diameter of the latching pins. Each latching strip 60 features in the region of the recesses 62 a respective positioning block 68, the function of which is described further below. The positioning recess 26 and the positioning block 68 act together as positioning elements. At each end of each latching strip 60 a notch 70 is provided in each longitudinal sidewall 54, this notch extending slightly beyond more than half the height of the sidewalls. Each latching strip 60 is in addition provided with openings 67 which are in alignment with the openings 24 of the housing 10 as well as with the openings 43 of the retaining ring 16 when the cover is fitted.

The gas bag module in accordance with the invention is assembled in the following way: the inflator 12 is first inserted in the mount 20 of the housing 10. Then, the locating bolt 32 is screwed through the hole 30 into the threaded hole 34 so as to fasten the inflator 12 in the housing 10.

Subsequently, the retaining ring 16 is inserted into the gas bag 14, and the gas bag 14, lying on the retaining ring 16, is folded. The folded wall package is supported by the supporting land 46 so that it is unable to sag through the retaining ring 16. After this the cover 18 is placed on the folded gas bag 14 and the retaining ring 16. Due to the notches 70, the latching strips 60 can easily be pulled outwards so that the cover can be placed on the retaining ring 16 so far that the latching strips 60 engage behind the retaining ring 16. By lightly pressing the latching strips 60 towards the middle of the retaining ring 16, the recesses 62 are urged onto the latching pins 42, as a result of which the clamping section 66 is slightly expanded until the latching pins are received in the widened portion 64. The cover 18 is then safely and reliably secured to the retaining ring 16 due to the clamping effect of the retaining ring 16 and by means of the recesses 62 snapped into place on the latching pins 42. In this way a preassembled module is formed which can be handled irrespective of the assembly formed by the inflator 12 and the housing 10.

Subsequently, the assembly consisting of the retaining ring 16, the gas bag 14 and the cover 18 is placed onto the assembly formed by the inflator 12 and the housing 10, the snap-action hooks 44 locking into place in corresponding openings of the housing 10. The two assemblies are then bolted together by the bolts 80 being screwed into the openings 43 of the retaining ring 16, these bolts passing through openings 24 of the housing 10 and through the openings 67 of the cover 18. In this arrangement, the openings 24 and 67 are configured with a diameter larger than that of the openings 43 so that the bolts engage only the openings 43. So the gas bag is fixed relative to the gas bag module due to it being clamped in place between the retaining ring 16 and the latching strips 60 of the cover 18. The cover 18 is secured to the gas bag module since it is clamped in place between the retaining ring 16 and the mounting ledges 22 of the housing 10.

In accordance with the invention, the housing 10, the retaining ring 16 and the cover 18 are fabricated of plastic material, it having being discovered namely that this material too, is able to satisfy all requirements on such a gas bag module. Following activation of the inflator 12, the housing 10 is possibly slightly expanded; however, the functioning of the gas bag module is not affected by these deformations. Due to the cover positively engaging the mounting ledge of the housing 10 and due to the deformation section 48 of the retaining ring 16, the other components of the gas bag module are able to follow these deformations so that it is assured that the components remain safely secured to each other.

In FIGS. 4 to 8, a variant of a gas bag module in accordance with the invention is illustrated, this variant differing from the embodiment as described above merely slightly, so that reference can be made to the above description for the most part. Differences exist substantially in the form of the latching pins 42 employed and in the number of sealing strips 28 provided.

In accordance with this variant, latching pins 42' are provided which feature an enlarged head. This head is to be received in corresponding recesses 65 in the latching strip 60.

In this case, two sealing strips 28 are provided in the mount 20 of the housing 10, thereby further minimizing the flow losses in the interior of the housing 10.

What is claimed is:

1. A gas bag module for a vehicle occupant restraint system comprising a housing for an inflator, a retaining ring for a gas bag and a cover for said gas bag; said housing, said retaining ring and said cover being formed from plastic material, said cover including latching elements snapped into place on said retaining ring, said cover being provided with a latching strip engaging behind said retaining ring, said latching elements being configured on said latching strip, said retaining ring including latching pins, each latching element of said cover comprising a recess, said recess having a widened portion with a diameter which corresponds to a diameter of said latching pins, and having a clamping section with a width which is smaller than said diameter of said latching pins.

2. The gas bag module of claim 1, wherein said cover including positioning elements and said housing including complementary positioning parts, said positioning elements engaging said positioning parts with an interlocking fit.

3. The gas bag module of claim 1, wherein said positioning elements consist of raised positioning blocks arranged on said latching strip and wherein said positioning parts are formed by positioning cavities configured in a fixture strip on said housing.

4. The gas bag module of claim 1, wherein said retaining ring comprises at least one snap-action hook locked into place in a complementary opening in said housing.

5. The gas bag module of claim 1, wherein said cover is box-shaped and includes a closed upper side facing away from said housing and an open underside facing said housing, side walls extending between said upper side and said underside, said side walls including notches emanating from said underside.

6. The gas bag module of claim 5, wherein each of said notches extends beyond more than half of said height of said cover.

7. The gas bag module of claim 1, wherein a gas bag having a wall and an interior is provided, said retaining ring being provided in said interior.

8. The gas bag module of claim 7, wherein said wall of said gas bag is fastened between said retaining ring and said cover.

9. The gas bag module of claim 1, wherein said retaining ring has a shell-like retaining section for an inflator.

10. The gas bag module of claim 1, wherein said housing said cover and said retaining ring include openings for bolts tensioning said retaining ring relative to said housing whereby said cover and said gas bag are clamped between said housing and said retaining ring.

11. The gas bag module of claim 1, wherein said retaining ring and said gas bag cover form a pre-assembled unit.

12. The gas bag module of claims 1, wherein said housing has an interior in which an inflator is arranged, said inflator having a threaded hole and said housing having a hole for a locating bolt, said locating bolt securing said inflator to said housing so that said housing and said inflator form a pre-assembled unit.

13. The gas bag module of claim 12, wherein said inflator includes an outer wall and said housing includes a bottom, said bottom having at least one sealing strip engaging said outer wall of said inflator.

14. A gas bag module for a vehicle occupant restraint system comprising a housing for an inflator, a retaining ring for a gas bag and a cover for said gas bag; said housing, said retaining ring and said cover being formed from plastic material, said cover including latching elements snapped into place on said retaining ring, said retaining ring including latching pins, each latching element of said cover comprising a recess, said recess having a widened portion with a diameter which corresponds to a diameter of said latching pins, and having a clamping section with a width which is smaller than said diameter of said latching pins, and each of said recesses being configured in a positioning block.

15. A gas bag module for a vehicle occupant restraint system comprising a housing for an inflator, a retaining ring for a gas bag and a cover for said gas bag; said housing, said retaining ring and said cover being formed from plastic material, said cover including latching elements snapped into place on said retaining ring, said retaining ring including latching pins, each latching element of said cover comprising a recess, said recess having a widened portion with a diameter which corresponds to a diameter of said latching pins, and a gas bag having a wall and an interior, said retaining ring being provided in said interior, said wall having an inflation opening bordered by a rim, said retaining ring being arranged adjacent said rim of said inflation opening, said latching pins engaging openings in said rim of said inflator opening.

16. A gas bag module for a vehicle occupant restraint system comprising a housing for an inflator, a retaining ring for a gas bag and a cover for said gas bag; said housing, said retaining ring and said cover being formed from plastic material, said cover including latching elements snapped into place on said retaining ring, said gas bag module being elongated and said retaining ring including expansion structures permitting a widening in a direction transverse to a longitudinal axis of said module in an extension plane of said retaining ring.

17. The gas bag module of claim 16, wherein said retaining ring has two opposing longitudinal sides and includes at least one supporting land extending between said longitudinal sides, said expansion structure of said retaining ring being formed by at least one deformation section arranged between an end of said supporting land and a corresponding longitudinal side.

* * * * *